(12) United States Patent
Sakamoto et al.

(10) Patent No.: US 6,602,486 B2
(45) Date of Patent: *Aug. 5, 2003

(54) METHOD FOR SEPARATING AND TREATING EXHAUST GAS OF CARBON FIBER

(75) Inventors: Yoshihisa Sakamoto, Kanagawa (JP); Nobuhiro Matsumoto, Kanagawa (JP); Kunio Nishimura, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/231,128

(22) Filed: Aug. 30, 2002

(65) Prior Publication Data

US 2003/0007919 A1 Jan. 9, 2003

Related U.S. Application Data

(62) Division of application No. 09/466,807, filed on Dec. 20, 1999, now Pat. No. 6,464,950.
(60) Provisional application No. 60/163,391, filed on Nov. 4, 1999.

(30) Foreign Application Priority Data

| May 22, 1998 | (JP) | 10-141250 |
| Jan. 5, 1999 | (JP) | 11-265 |
| Mar. 2, 1999 | (JP) | 11-54713 |

(51) Int. Cl.$^7$ ................................. D01F 9/12
(52) U.S. Cl. ............... 423/447.1; 423/210; 423/245.3; 423/447.2; 423/447.7; 588/205
(58) Field of Search ............... 423/210, 245.3, 423/447.1, 447.2, 447.7; 588/205

(56) References Cited

U.S. PATENT DOCUMENTS

| 4,552,743 A | 11/1985 | Torigata et al. |
| 5,193,996 A | 3/1993 | Mullen |
| 6,464,950 B1 * | 10/2002 | Morita et al. ............ 423/210 |

FOREIGN PATENT DOCUMENTS

| JP | 52-103528 | 8/1977 |
| JP | 58-180615 A | 10/1983 |
| JP | 60-054998 A | 3/1985 |
| JP | 61-291497 A | 12/1986 |
| JP | 7-150419 | 6/1995 |
| JP | 8-60444 A | 3/1996 |

OTHER PUBLICATIONS

English translation of JP 8–60,444 A Mar. 5, 1996.*

* cited by examiner

Primary Examiner—Stanley S. Silverman
Assistant Examiner—Timothy C Vanoy
(74) Attorney, Agent, or Firm—Sughrue Mion, PLLC

(57) ABSTRACT

A method for producing carbon fiber including the following processes: a process for obtaining fine carbon fiber by thermally decomposing an organic compound in a furnace by use of a catalyst; a process for separating a reaction exhaust gas contained in the carbon fiber; a process for continuously subjecting the carbon fiber to thermal treatment in a non-oxidative atmosphere; and a process for incinerating a thermal treatment exhaust gas generated in the thermal treatment and/or the reaction exhaust gas. The method for separating a reaction exhaust gas from carbon fiber is characterized in that a packed carbon fiber layer is formed, an inert gas is caused to flow through the layer, and the layer is compressed. Combustion of the reaction exhaust gas and combustion of the exhaust gas generated from the subsequent thermal treatment is achieved through employment of a pilot burner holding flame at all times in a vertical incinerator.

9 Claims, 3 Drawing Sheets

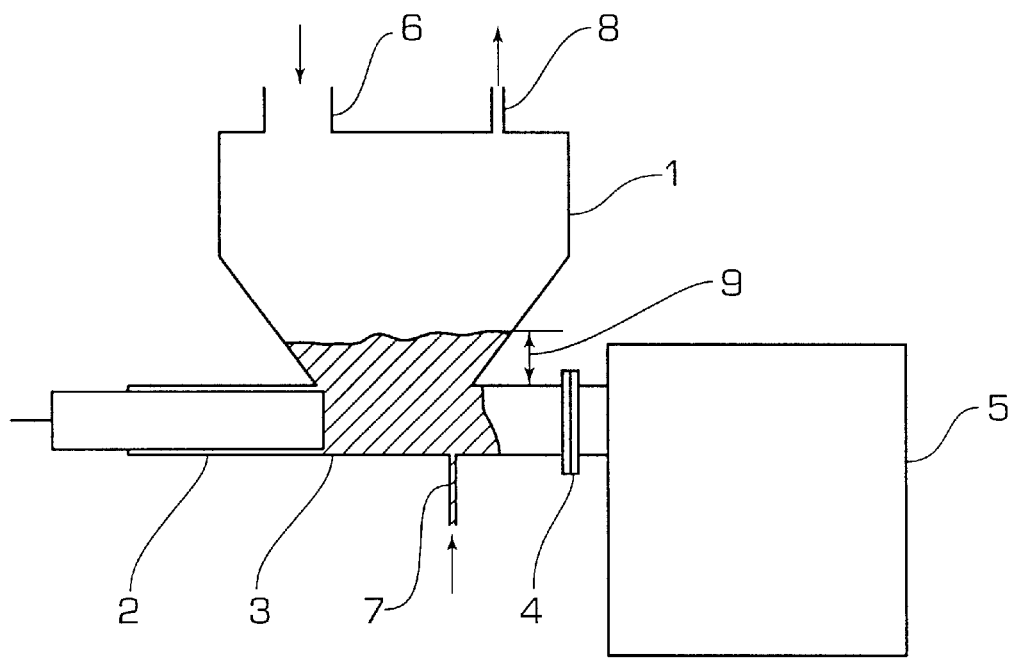
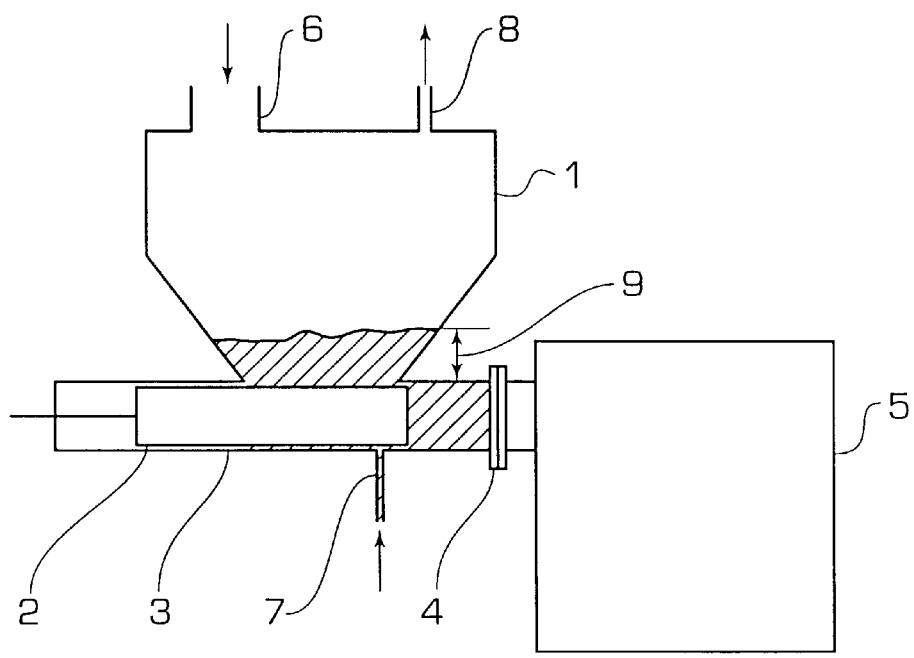

METHOD FOR SEPARATING AND TREATING EXHAUST GAS OF CARBON FIBER

CROSS REFERENCE TO RELATED APPLICATION

This is a divisional of application Ser. No. 09/466,807 filed Dec. 20, 1999, now U.S. Pat. No. 6,464,950, which claims benefit of Provisional Application No. 60/163,391 filed Nov. 4, 1999; the above-noted prior applications are each hereby incorporated by reference.

FIELD OF THE INVENTION

The present invention relates to a method for separating a reaction exhaust gas from production of carbon fiber and an apparatus used for separation of the gas, which exhaust gas is generated in a reaction furnace during production of carbon fiber, more particularly vapor-grown carbon fiber formed by thermal decomposition of an organic compound in a reducing atmosphere containing hydrogen; to a method for treating exhaust gasses and an incinerator used for treatment of the gasses, which gasses include the reaction exhaust gas and/or a thermal treatment exhaust gas generated during thermal treatment, including firing and graphitization, performed in a post-process; and to a method for producing the carbon fiber.

BACKGROUND OF THE INVENTION

Carbon fiber is produced from a variety of raw materials, and fine carbon fiber is produced through a method in which an organic compound such as methane, ethylene, benzene, or toluene is thermally decomposed at 800–1,300° C. in a thermal-decomposition furnace containing a reducing gas such as hydrogen or carbon monoxide, by use of a transition metal such as iron serving as a catalyst; i.e., a seed.

Specific examples of methods for producing carbon fiber include:

(1) a method for producing carbon fiber in which super-fine powder of a transition metal is distributed on a substrate in a thermal-decomposition furnace and used as seeds (Japanese Patent Application Laid-Open (kokai) No. 103528/1977);

(2) a method for producing carbon fiber in which a transition metal compound such as ferrocene is vaporized and introduced into a thermal-decomposition furnace to thereby form super-fine powder of a transition metal, and the powder is used as seeds (Japanese Patent Application Laid-Open (kokai) No. 54998/1985);

(3) a method for producing carbon fiber in which a transition metal such as iron is directly vaporized in a thermal-decomposition furnace to thereby form super-fine powder, and the powder is used as seeds (Japanese Patent Application Laid-Open (kokai) No. 29 1497/1986); and (4) a method for producing carbon fiber in which a transition metal compound such as ferrocene is diffused or dissolved in an organic compound serving as a raw material, and the resultant mixture is introduced into a thermal-decomposition furnace to thereby form super-fine powder of a transition metal, and the powder is used as seeds (Japanese Patent Application Laid-Open (kokai) No. 180615/1983).

Japanese Patent No. 2778434 discloses a method for producing carbon fiber, in which an organic compound containing a transition metal such as iron, serving as a catalyst, is dissolved in a raw material liquid such as benzene, and the resultant solution is sprayed on the inner wall of a reaction furnace heated at 800–1,300° C., to thereby thermally decompose the material. Specifically, a transition metal compound such as ferrocene, serving as a catalyst, is dissolved in a liquid organic compound such as benzene, and the resultant solution is sprayed on the inner wall of a reaction tube, serving as a thermal-decomposition furnace, by use of hydrogen serving as a carrier gas, to thereby form seeds and thermally decompose the organic compound. As a result, crude carbon fiber of fine fibrous shape is produced. (Hereinafter the above process will be referred to as "the first process.")

The thus-produced carbon fiber or the reaction furnace contains flammable gases including a carrier gas such as hydrogen, and hydrocarbon generated in a side reaction (hereinafter the flammable gases will be collectively referred to as "reaction exhaust gas"), and thus the gas must be separated. A reaction exhaust gas which is separated from carbon fiber in a reaction furnace is collected with relative ease, but a reaction exhaust gas contained in carbon fiber, or in other words, captured between filaments of the carbon fiber, is difficult to separate.

Conventionally, a reaction exhaust gas is separated from carbon fiber containing the reaction exhaust gas by means of the following methods: (1) a method in which the temperature of a thermal-decomposition furnace is lowered after completion of reaction, and the inside of the furnace is substituted by nitrogen gas, to thereby separate the reaction exhaust gas; and (2) a method in which a recovery can is provided in a lower portion of a thermal-decomposition furnace, and carbon fiber containing a reaction exhaust gas is recovered in the can and the inside of the can is substituted by nitrogen gas, to thereby separate the exhaust gas.

However, when carbon fiber is industrially produced, in the above method (1), reaction or recovery is carried out batchwise, which is disadvantageous in terms of efficiency. In addition, the temperature of a thermal-decomposition furnace must be lowered, which is unsatisfactory in consideration of energy efficiency.

In the above method (2), a large recovery tube is required, due to low bulk density of carbon fiber, which results in high cost.

In the methods (1) and (2), the produced carbon fiber has a very low bulk density of 0.001–0.005 $g/cm^3$ as measured immediately after production, which means a large volume of space between fibers. Thus, gas held in such space cannot be completely removed from the carbon fiber, and may directly accompany the fiber product.

In addition, the carbon fiber is detrimentally difficult to handle due to its low bulk density.

A recovered reaction exhaust gas is flammable and explosive, since the gas predominantly contains hydrogen. Therefore, conventionally, the gas is diluted in a blower in order to reduce the concentration of hydrogen below the range causing explosion, and then released in the air.

The crude carbon fiber produced in the reaction tube in the first process is usually scraped off and collected. The collected carbon fiber contains non-reacted organic substances, non-fibrous carbides, and tar, and therefore, in the next process the carbon fiber is thermally treated in a non-oxidative atmosphere. For example, the carbon fiber is subjected to thermal treatment such as firing and graphitization in a closed furnace as disclosed in Japanese Patent Application Laid-Open (kokai) No. 60444/1996, in a non-oxidative atmosphere of nitrogen, helium, or argon at a temperature which varies depending on required properties of a final product. (Hereinafter the above process will be referred to as "the second process.")

An exhaust gas generated in the second process predominantly contains inert gasses such as argon and nitrogen. In addition, the exhaust gas contains naphthalene, anthracene, and high-molecular weight substances such as tar, and thus the gas is difficult to combust. (Hereinafter the gas will be referred to as "thermal treatment exhaust gas.")

Since the thermal treatment exhaust gas is difficult to combust, there was no other way than releasing it as is.

The present invention contemplates provision of a method and apparatus for continuously separating a reaction exhaust gas from carbon fiber with ease and in a safe manner, which exhaust gas is generated in the first process during production of carbon fiber through the above-described vapor-growth method, as well as a method and apparatus for combusting and air-releasing exhaust gasses at low cost, which gasses include the flammable reaction exhaust gas and a thermal treatment exhaust gas which is generated during thermal treatment in the second process and is difficult to combust.

The present invention also contemplates provision of a method for producing carbon fiber, including the above methods and apparatus.

Particularly, exposure of an operator to an organic compound such as benzene is regulated by the Law on Industrial Safety and Hygiene. In addition, such an organic compound is poisonous, and thus must be prevented from being released in the air. Meanwhile, hydrogen, methane, and ethylene are flammable substances, and leakage thereof may cause explosion.

Tar is difficult to collect, because of its high viscosity. A method for condensing tar by use of activated carbon or for causing tar to be adsorbed by activated carbon requires large-scale handling equipment, and tar poses problems in relation to waste treatment.

Moreover, in consideration of hygiene, tar must be handled carefully. Tar is preferably incinerated for disposal, but tar per se cannot be incinerated, since it is a high-molecular weight substance and contains inert gasses.

In order to solve these problems, the present inventors have studied a method for combusting a reaction exhaust gas. However, a reaction in the first process needs to be terminated in order to carry out equipment maintenance, and at such times only the second process may be carried out. In thermal treatment in the second process, the rate of generation of a thermal treatment exhaust gas is not constant, since the amount of carbon fiber varies. Therefore, by means of only a method for combusting such exhaust gasses, stable incineration is not carried out, and backfire to a reactor and a thermal treatment apparatus occurs, permitting damage to, for example, the apparatus. In addition, when fire is caused to be extinguished for some reason, a combustion apparatus may be filled with a reaction exhaust gas of high concentration, which provides a problem at re-ignition.

SUMMARY OF THE INVENTION

Accordingly, the present invention provides a series of processes for producing fine carbon fiber. Namely, the present invention provides a method for producing carbon fiber comprising: thermally decomposing an organic compound in a thermal-decomposition furnace at 800–1,300° C. in an atmosphere containing a reducing gas, by use of a transition metal or a compound thereof serving as a catalyst, to thereby obtain fine carbon fiber; separating a reaction exhaust gas contained in the carbon fiber from the carbon fiber; continuously subjecting the carbon fiber to thermal treatment such as firing or graphitization in a non-oxidative atmosphere; and incinerating a thermal treatment exhaust gas generated during the thermal treatment, and/or the separated reaction exhaust gas.

The present invention also provides a method and apparatus for treating exhaust gasses, which gasses include an unwanted exhaust gas which is generated during a process for producing carbon fiber and an exhaust gas generated during thermal treatment such as firing or graphitization in the second process.

Specifically, such a method and apparatus for treating exhaust gasses according to the present invention contemplate a first method and apparatus for industrially separating a flammable exhaust gas from carbon fiber predominantly containing the gas, in a safe and continuous manner, and a second method and apparatus for incinerating in a dedicated incinerator the separated reaction exhaust gas and a thermal treatment exhaust gas from the second process, such that the gasses are incinerated independently or in combination. According to the first method; i.e., a method for industrially separating a flammable exhaust gas from carbon fiber during production of carbon fiber, a packed layer of carbon fiber is formed, the carbon fiber being produced at an outlet side of a reaction furnace of vapor-grown carbon fiber in the first process; an inert gas is caused to flow upward from the lower side of the packed layer; and the packed layer is compressed. According to the first apparatus used for separating the exhaust gas from vapor-grown carbon fiber, there are provided, as shown in FIG. 1, a separation tank 1 in which a packed layer of vapor-grown carbon fiber is formed; a compression chamber 3 provided at the lower portion of the tank, the chamber comprising a compression cylinder 2 and an inert gas inlet 7; and a shut-off valve 4 which enables switching between compression and exhaust.

According to the second method; i.e., a method for incinerating in a dedicated incinerator the separated reaction exhaust gas and a thermal treatment exhaust gas from the second process, there are provided the following:

(1) a method for treating an exhaust gas comprising incinerating an exhaust gas generated in the production process of vapor-grown carbon fiber (hereinafter referred to as "exhaust gas of vapor-grown carbon fiber") of vapor-grown carbon fiber in a dedicated incinerator; and (2) a method for treating an exhaust gas comprising mixing exhaust gasses; i.e., a flammable reaction exhaust gas and a thermal treatment exhaust gas which is difficult to combust and which is generated during firing or graphitization, and incinerating the gasses simultaneously, or incinerating either of the gasses in the incinerator. The above methods (1) and (2) are further defined as follows:

(3) a method for treating an exhaust gas of vapor-grown carbon fiber, in which the gas is combusted after being ignited by a flame of a pilot burner which is maintained by use of a flammable gas. In consideration of safety, the second method is preferably drawn to:

(4) a method for treating an exhaust gas of vapor-grown carbon fiber, in which a reaction exhaust gas in a reaction exhaust gas supply pipe is purged into the incinerator and incinerated upon completion of thermal reaction of vapor-grown carbon fiber, or in which a thermal treatment exhaust gas in a thermal treatment exhaust gas supply pipe is purged into the incinerator and incinerated upon completion of thermal treatment of the fiber;

(5) a method for treating an exhaust gas of vapor-grown carbon fiber, in which backfire-preventing apparatuses are provided in the supply pipes of a reaction exhaust gas and a thermal treatment exhaust gas leading into the incinerator, so as to enhance safety of a production apparatus; and (6) a method for treating an exhaust gas of vapor-grown carbon fiber, in which flames of the pilot burner and a primary burner are monitored at all times, and when the flames are caused to be extinguished, supply of a reaction exhaust gas is switched to a release-to-air pipe, to thereby stop supply of the exhaust gases into the incinerator and enhance safety of the incinerator.

In order to attain any one of the above-described methods (1) through (6), the following incinerator is provided:

(7) an incinerator for processing an exhaust gas of vapor-grown carbon fiber, which comprises a primary burner for supplying a reaction exhaust gas, an auxiliary burner for supplying a thermal treatment exhaust gas, and a pilot burner for igniting the exhaust gasses by use of a flammable gas.

As used herein, the term "carbon fiber" refers to annual-ring-form carbon fiber of multi-layer structure having a diameter of 0.01–5 $\mu$m, which fiber is vapor-grown in a thermal reaction furnace according to the first and second method for treating an exhaust gas.

BRIEF DESCRIPTION OF THE DRAWINGS

FIG. 1 is a cross-sectional schematic representation showing an embodiment of a reaction exhaust gas separating apparatus of the present invention.

FIG. 2 is a cross-sectional schematic representation showing a compression process of carbon fiber in a reaction exhaust gas separating apparatus of the present invention.

DETAILED DESCRIPTION OF THE INVENTION

Figure 3:
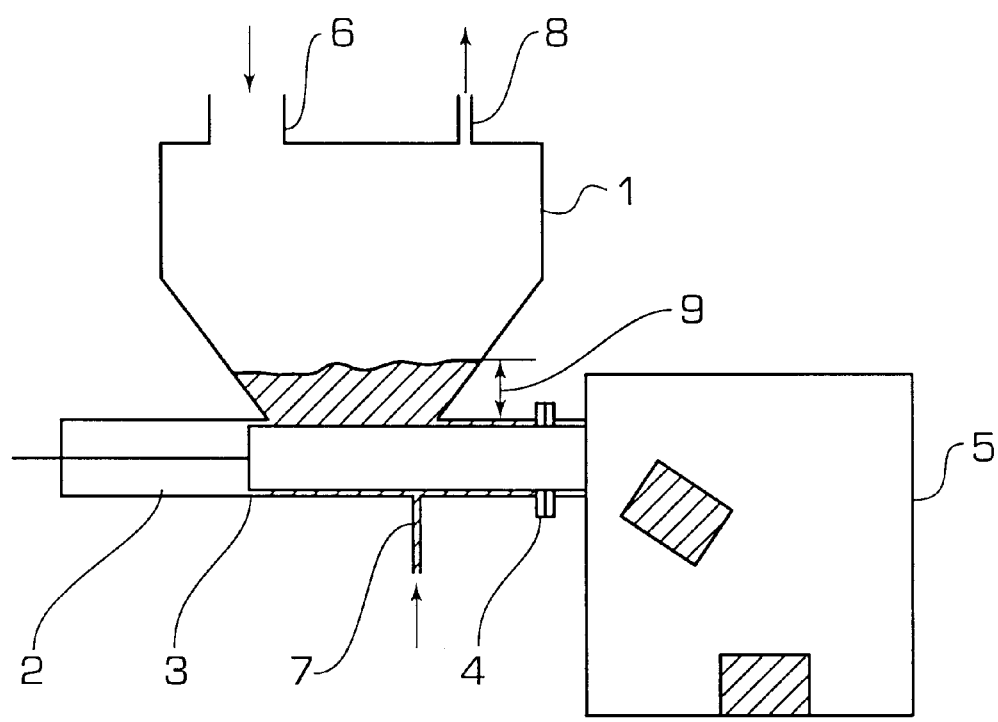
FIG. 3 is a cross-sectional schematic representation showing an extrusion-recovery process of carbon fiber in a reaction exhaust gas separating apparatus of the present invention.

The present invention will next be described in more detail.

A separation tank is provided at the outlet side of a reaction furnace, and carbon fiber is collected in the tank to thereby form a packed layer of carbon fiber.

The height of the layer is preferably 200 mm or more. When the height is less than 200 mm, the layer tends to be contaminated with gas. The bulk density of the layer preferably falls within a range of 0.005–0.05 g/cm$^3$ inclusive.

When the bulk density is less than 0.005 g/cm$^3$, resistance of the layer becomes low and the layer tends to be contaminated with gas. In contrast, when the bulk density is more than 0.05 g/cm$^3$, purge gas encounters difficulty in flowing through the layer uniformly, and thus gas in the layer is insufficiently substituted by the purge gas. The bulk density of carbon fiber can be regulated by controlling reaction conditions of carbon fiber or by compaction during conveyance of carbon fiber from a reaction furnace to a separation tank.

Purge gas used in the present invention may be any inert gas, such as nitrogen gas or argon gas. Purge gas is caused to flow from one side to the other side of a packed layer of carbon fiber. In most cases, the produced carbon fiber contains gas which is lighter than air, and thus purge gas is preferably caused to flow from the lower side to the upper side of the layer.

Purge gas is preferably introduced into a packed layer of carbon fiber from the lower side at a linear velocity of 0.5 cm/second or more. When the linear velocity is less than 0.5 cm/second, the layer may be contaminated with gas.

In addition, in order to remove gas present between the filaments of carbon fiber and increase the bulk density of carbon fiber, a packed layer of carbon fiber is compressed.

A packed layer of carbon fiber is preferably compressed so as to have a volume which is about ½ or less that before compression. Subsequently, a shut-off valve is opened and the compressed layer is intermittently removed through the valve. Alternatively, the compressed layer of carbon fiber may be continuously removed without use of a shut-off valve, by extrusion through an outlet having a squeezed head portion.

When a packed layer of carbon fiber is compressed so as to have a volume which is in excess of ½ that before compression, the layer has a large volume of interfiber space. Thus, when the layer is continuously removed, gas in the layer cannot be separated sufficiently, permitting gas to accompany the carbon fiber product.

Specifically, a pressure for compression is 0.1 kg/cm$^2$ or more, preferably 1.0 kg/cm$^2$ or more. When the pressure is less than 0.1 kg/cm$^2$, gas held between filaments of the carbon fiber is insufficiently separated. The pressure may be higher, preferably to the extent that carbon fiber does not collapse. When the pressure becomes higher, facility cost of the pressurizing system becomes higher. Therefore, the pressure preferably falls within a range of 0.1–100 kg/cm$^2$, more preferably 1–100 kg/cm$^2$, still more preferably 1–50 kg/cm$^2$.

The process by use of purge gas may be carried out prior to the compression process, or vice versa. Alternatively, these processes may be repeated alternately. However, in consideration of time and efficiency, the process making use of purge is carried out prior to the compression process, to thereby enhance effects. A compressed carbon fiber obtained through these processes is preferable in consideration of easy handling to the next process.

The present invention will be described in more detail with reference to FIGS. 1, 2, 3, and 4, which description should not be construed as limiting the invention thereto.

In FIGS. 1, 2, and 3, reference numeral 1 represents a separation tank, 2 represents a compression cylinder, 3 represents a compression chamber, 4 represents a shut-off valve, 5 represents a recovery vessel, 6 represents an outlet of an apparatus for producing carbon fiber (and an inlet of separation tank 1; the apparatus for producing carbon fiber is not shown in the figures.), 7 represents an inert gas inlet, 8 represents an inert gas outlet, and 9 represents the height of a packed layer of carbon fiber.

Gas-containing carbon fiber which is produced in a reaction furnace (not shown in the Figs.) is conveyed to the separation tank 1 through the outlet 6, to thereby form a packed layer of the carbon fiber in the tank 1.

In this case, the height of the layer 9 is maintained at 200 mm or more. As described above, when the height is less than 200 mm, the layer tends to be contaminated with gas.

Subsequently, nitrogen gas is introduced through the inert gas inlet 7 provided in the compression chamber 3 at the lower side of the packed layer, to thereby purge gas contained in the layer. The inlet(s) may be provided in a quantity according to the size or height of a packed layer of carbon fiber.

Next, as shown in FIG. 2, the carbon fiber is compressed by use of the compression cylinder 2 so as to have a volume which is ½ or less that before compression. The pressure for compression preferably falls within a range of 0.1–100 kg/cm$^2$. The carbon fiber may be removed without use of the shut-off valve 4, by extrusion through an outlet having a squeezed head portion.

As shown in FIG. 3, the shut-off valve 4 is opened, and the thus-compressed carbon fiber is recovered in the recovery vessel 5. Alternatively, the carbon fiber is recovered in the vessel 5 by extrusion without use of the shut-off valve 4, through an outlet having a squeezed head portion.

When the recovery vessel 5 is filled with the carbon fiber, the vessel is replaced by a new one, to thereby continuously carry out separation of gas from carbon fiber.

Figure 4:
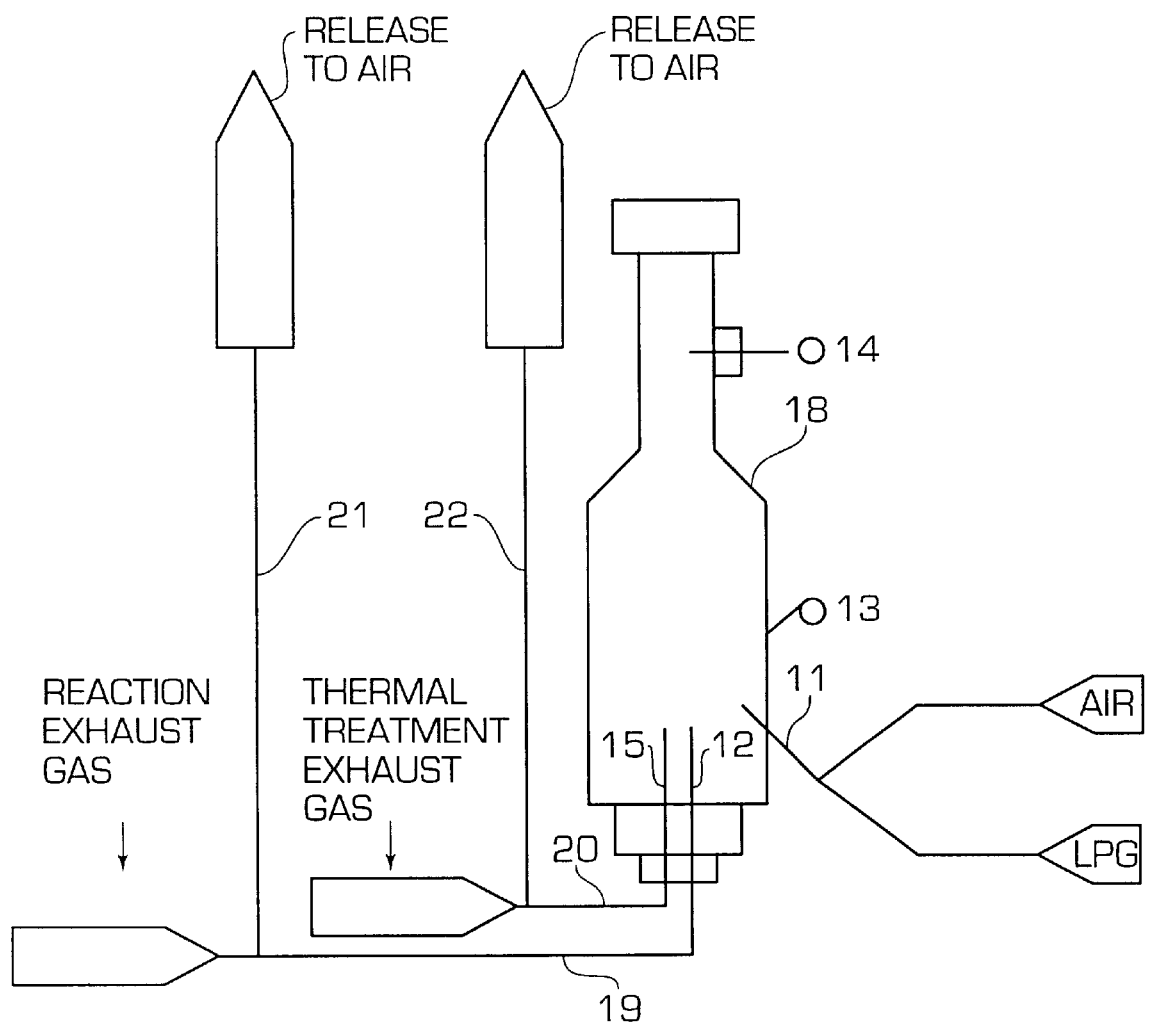
FIG. 4 is a cross-sectional schematic representation showing an embodiment of an incinerator of the present invention, which is used for incinerating a reaction exhaust gas and a thermal treatment exhaust gas.

In a method for treating a reaction exhaust gas and/or a thermal treatment exhaust gas of vapor-grown carbon fiber according to the present invention, as shown in FIG. 4, a vertical incinerator 18 is employed, a flammable gas is continuously combusted in the incinerator 18 by use of a pilot burner 11, and a reaction exhaust gas is supplied through a primary burner 12 into the incinerator and ignited by use of a flame of the pilot burner 11, to thereby incinerate the exhaust gas.

A flammable gas may be any of commercially available gasses, such as propane gas or city gas.

A reaction exhaust gas in the present invention is usually flammable and capable of being incinerated. However, in the case of incineration of the gas, since the reaction exhaust gas is flammable, the following must be carefully considered: a method for igniting the reaction exhaust gas when the gas is generated after initiation of reaction; change in pressure of the reaction exhaust gas during reaction; and occurrence of backfire when generation of the reaction exhaust gas stops after completion of reaction.

Therefore, in a method for igniting a reaction exhaust gas, the pilot burner 11 is turned on at all times in the incinerator 18 such that a reaction exhaust gas is ignited immediately after supply of the gas. The reaction exhaust gas is supplied through a reaction exhaust gas supply pipe 19 and the primary burner 12, which comprises a nozzle portion for providing the gas with resistance, and thus backfire does not occur even when changes in pressure occur.

When supply of a reaction exhaust gas is terminated after completion of reaction, a reaction exhaust gas in the reaction exhaust gas supply pipe 19 is purged into the incinerator 18 by use of an incombustible gas, and the remaining reaction exhaust gas in a reaction system and the supply pipe 19 is incinerated, to thereby prevent backfire into the supply pipe 19.

Flame of the pilot burner 11 and a combustion flame of a reaction exhaust gas of the primary burner 12 are monitored through the flame detector 13 at all times in the incinerator 18. When the flames are caused to be extinguished for some reason, the reaction exhaust gas cannot be ignited, and thus the reaction exhaust gas is supplied not to the incinerator 18 but to a release-to-air pipe 21, and supply of the exhaust gas to the incinerator 18 is terminated. In addition, the reaction is immediately terminated and the reaction exhaust gas is purged by use of an incombustible gas.

A checking apparatus such as a flame arrester or a water sealing apparatus may be provided in the supply pipe 19 of a reaction exhaust gas into the incinerator 18.

Furthermore, sequence control may be performed so as to regulate a reaction in which a flammable reaction exhaust gas is generated, such that the reaction proceeds only when the pilot burner 11 in the incinerator 18 is turned on.

The present invention is characterized in that a supply pipe 20 and a release-to-air pipe 22 of a thermal treatment exhaust gas which is difficult to combust is independently provided and the exhaust gas is supplied to the incinerator through an auxiliary burner 15. Accordingly, hydrogen, organic compounds, such as methane and ethylene, which have relatively high volatility and high flammability, and tar and the like, which have high viscosity at ambient temperature and are relatively difficult to combust, are combusted simultaneously. As a result, the mixture gas enables combustion of the thermal treatment exhaust gas, and combustion efficiency is enhanced.

The above-described ignition method, the backfire-preventing method, the purge method, and the treatment when fire is caused to be extinguished in a reaction exhaust gas are applicable to a thermal treatment exhaust gas.

Even when supply of a reaction exhaust gas is terminated, since a flammable gas is used as a fuel, only a thermal treatment exhaust gas can be supplied to the incinerator and combusted efficiently. In addition, the pilot burner 11 in the incinerator is turned on at all times, and thus a reaction exhaust gas and a thermal treatment exhaust gas can be stably combusted regardless of change in amount thereof.

EXAMPLES

Example 1

In a vertical reaction furnace, a benzene raw-material solution containing 4 wt. % ferrocene as dissolved therein was sprayed onto the inner wall of a reaction tube through a two-fluid spray nozzle by use of hydrogen gas serving as a carrier gas, to thereby grow carbon fiber. The flow rate of hydrogen gas was 100 L/minute and the temperature of the inner wall was 1,200° C. The carbon fiber grown on the inner wall was scraped off, to thereby obtain crude carbon fiber. The crude carbon fiber was collected in a separation tank 1 shown in FIG. 1.

When the height of a packed layer of the collected carbon fiber in the tank 1 became 200 mm, nitrogen gas was caused to flow through an inert gas inlet 7 at a rate of 50 L/minute. When the height of the layer in the tank 1 became 500 mm or more, a compression cylinder 2 was operated, and the vapor-grown carbon fiber was compressed so as to have a volume which was ½ that before compression. In this case, the pressure for compression was 1 kg/cm$^2$.

The bulk density of the packed layer before compression was 0.01 g/cm$^3$.

Subsequently, a shut-off valve 4 was opened, and the compression cylinder 2 was re-operated to thereby discharge the compressed carbon fiber into a recovery vessel 5. Thereafter, the cylinder 2 was moved to its original position, and the valve 4 was closed.

While the reaction of carbon fiber was carried out, the above-described procedures was repeated, to thereby recover carbon fiber in the recovery vessel.

During recovery of carbon fiber, hydrogen in the recovery vessel was analyzed through a hole for sampling, by use of a hydrogen detector (model: GP-226, product of Riken Keiki), but hydrogen was not detected. Methane gas and ethylene gas, which are generated during the reaction of carbon fiber, were analyzed through gas chromatography but not detected.

The recovered carbon fiber in the recovery vessel had a diameter of 0.06 μm and a bulk density of 0.02 g/cm³.

Example 2

The carbon fiber obtained in Example 1 was subjected to compression molding, and thermally treated under flow of argon in a continuous thermal treating furnace as disclosed in Japanese Patent Application Laid-Open (kokai) No. 60444/1996. The molded product was heated in the furnace at 1,400° C. for approximately 30 minutes.

A reaction exhaust gas generated in the process of Example 1 was supplied through a primary burner 12 at a rate of approximately 130 L/minute, and a thermal treatment exhaust gas generated in the above thermal treatment was supplied through an auxiliary burner 15 at a rate of approximately 30 L/minute. The reaction exhaust gas contained hydrogen in an amount of approximately 75%, benzene serving as a raw material; i.e., a carbon source, and organic compounds which had been by-produced. The thermal treatment exhaust gas contained argon as a primary component, and tar.

Before the reaction in the reaction furnace and before the thermal treatment in the thermal treatment furnace, the system was purged by use of nitrogen gas, and combustion was initiated. The reaction exhaust gas was supplied through the primary burner 12 to an incinerator 18 in which LPG serving as a fuel was combusted by use of a pilot burner 11, and the exhaust gas was combusted and incinerated. Simultaneously, the thermal treatment exhaust gas was supplied through the auxiliary burner 15 and combusted. The thus-incinerated waste gas, which was sampled from the waste gas sampling hole 14, contained benzene in an amount of 0.25 ppm or less, which represents the detection threshold.

After completion of the first process, a reaction vessel system was purged by use of nitrogen gas and the reaction exhaust gas was removed, and a primary valve was closed.

After completion of all the above processes, the continuous furnace system was purged by use of nitrogen gas, the thermal treatment exhaust gas was purged by use of nitrogen gas, and a flame of the primary burner 12 was extinguished.

In a method for treating an exhaust gas of vapor-grown carbon fiber of the present invention, a reaction exhaust gas containing methane, ethylene, and a flammable carrier gas such as hydrogen which is contained in carbon fiber during production thereof can be continuously separated with safety. In addition, the reaction exhaust gas and a thermal treatment exhaust gas generated in a thermal treatment process which is difficult to combust are completely combusted with safety.

What is claimed is:

1. A method for producing carbon fiber comprising a first step of thermally decomposing an organic compound in a thermal-decomposition furnace at 800–1,300° C. in an atmosphere containing a reducing gas, by use of a transition metal or a compound thereof serving as a catalyst, to thereby obtain carbon fiber, a second step of separating a reaction exhaust gas produced during the first step, wherein the second step includes forming a packed layer of carbon fiber at an outlet side of the thermal-decomposition furnace, causing an inert gas to flow upward from a lower side of the packed layer, and compressing the packed layer, and a third step in which the carbon fiber is subjected to a thermal treatment of firing or graphitization in a non-oxidative atmosphere.

2. The method for producing carbon fiber according to claim 1, wherein the carbon fiber has a diameter of 0.01–5 μm.

3. A method for producing carbon fiber comprising a first step of thermally decomposing an organic compound in a thermal-decomposition furnace at 800–1,300° C. in an atmosphere containing a reducing gas, by use of a transition metal or a compound thereof serving as a catalyst, to thereby obtain carbon fiber, a second step of separating a reaction exhaust gas produced during the first step, wherein the second step includes forming a packed layer of carbon fiber at an outlet side of the thermal-decomposition furnace, causing an inert gas to flow upward from a lower side of the packed layer, and compressing the packed layer, a third step in which the carbon fiber is subjected to a thermal treatment of firing or graphitization in a non-oxidative atmosphere, and a fourth step of incinerating a thermal treatment exhaust gas from the thermal treatment step and/or the separated reaction exhaust gas.

4. The method for producing carbon fiber according to claim 3, wherein the carbon fiber has a diameter of 0.01–5 μm.

5. The method for producing vapor-grown carbon fiber according to claim 3, wherein the reaction exhaust gas contained in the carbon fiber is separated.

6. The method for producing carbon fiber according to claim 3, wherein incineration of the thermal treatment exhaust gas from the thermal treatment step and/or the separated reaction exhaust gas is effected through ignition by use of flame from a pilot burner making use of a flammable gas as a fuel.

7. The method for producing carbon fiber according to claim 3, wherein incineration of the thermal treatment exhaust gas from the thermal treatment step and/or the separated reaction exhaust gas is effected in such a manner that the reaction exhaust gas in a reaction exhaust gas supply pipe is purged into the incinerator and incinerated upon completion of the decomposition of the organic compound, or that a thermal treatment exhaust gas in a thermal treatment exhaust gas supply pipe is purged into the incinerator and incinerated upon completion of thermal treatment of the carbon fiber.

8. The method for producing carbon fiber according to claim 3, wherein incineration of the thermal treatment exhaust gas from the thermal treatment step and/or the separated reaction exhaust gas is effected in the presence of backfire-preventing apparatuses provided in the supply pipes of the reaction exhaust gas and the thermal treatment exhaust gas leading into the incinerator.

9. The method for producing carbon fiber according to claim 3, wherein incineration of the thermal treatment exhaust gas from the thermal treatment step and/or the separated reaction exhaust gas is performed such that flames of a pilot burner and a primary burner are monitored at all times, and when the flames are caused to be extinguished, supply of a reaction exhaust gas is switched to a release-to-air pipe, to thereby stop supply of the exhaust gases into the incinerator.

* * * * *